United States Patent [19]

Derrick et al.

[11] Patent Number: 5,417,858
[45] Date of Patent: May 23, 1995

[54] SCREEN ASSEMBLY FOR VIBRATING SCREENING MACHINE

[75] Inventors: William W. Derrick, East Amherst; John J. Bakula, Grand Island, both of N.Y.

[73] Assignee: Derrick Manufacturing Corporation, Buffalo, N.Y.

[21] Appl. No.: 62,464

[22] Filed: May 14, 1993

Related U.S. Application Data

[63] Continuation-in-part of Ser. No. 4,122, Jan. 13, 1993, abandoned.

[51] Int. Cl.⁶ .................. B01D 33/03; B07B 1/46; B07B 1/49
[52] U.S. Cl. .................. 210/388; 210/493.1; 210/493.2; 210/493.3; 210/489; 210/490; 210/498; 210/499; 210/389; 209/397; 209/399; 209/401; 209/403; 209/329
[58] Field of Search .................. 210/387, 388, 493.1, 210/493.2, 493.3, 493.5, 232, 488, 489, 490, 498, 499, 389; 209/397, 398, 399, 401, 402, 403, 329, 330

[56] References Cited

U.S. PATENT DOCUMENTS

| | | |
|---|---|---|
| 40,242 | 10/1863 | Capell . |
| 246,144 | 8/1881 | Keeler . |
| 275,340 | 4/1883 | Kimball . |
| 500,302 | 6/1893 | Stoeckel et al. ............ 209/399 |
| 526,562 | 9/1894 | Cross ............ 209/397 |
| 560,858 | 5/1896 | Missroon ............ 209/399 |
| 607,598 | 7/1898 | Closz . |
| 691,045 | 1/1902 | Climenson et al. ............ 209/397 |
| 800,693 | 10/1905 | Traylor . |
| 964,144 | 7/1910 | Chavanne et al. ............ 209/403 |
| 964,897 | 7/1910 | Bryant . |
| 966,578 | 8/1910 | Murphy et al. . |
| 984,866 | 2/1911 | Tate . |
| 1,098,979 | 6/1914 | Schuchard . |
| 1,132,667 | 3/1915 | Milliot ............ 209/402 |
| 1,423,021 | 7/1922 | Reynolds ............ 209/403 |
| 1,462,804 | 7/1923 | Evans ............ 209/398 |
| 1,561,632 | 11/1925 | Woodward . |
| 1,947,307 | 2/1934 | Rafton ............ 209/401 |
| 1,997,713 | 4/1935 | Boehm ............ 209/401 |
| 1,997,740 | 4/1935 | Nickerson ............ 209/403 |
| 2,082,513 | 6/1937 | Roberts ............ 209/401 |
| 2,089,548 | 8/1937 | Frantz . |
| 2,274,700 | 3/1942 | Jenks ............ 209/401 |
| 2,315,055 | 3/1943 | Heller ............ 209/400 |
| 2,406,051 | 8/1946 | Weiss . |
| 2,462,878 | 3/1949 | Logue . |
| 2,648,441 | 8/1953 | Soldan . |

(List continued on next page.)

FOREIGN PATENT DOCUMENTS

| | | | |
|---|---|---|---|
| 505776 | 9/1951 | Belgium ............ | 209/403 |
| 453348 | 10/1991 | European Pat. Off. ............ | 209/397 |
| 3818972 | 2/1990 | Germany . | |
| 55-32404 | 8/1980 | Japan . | |
| 59-142818 | 8/1984 | Japan . | |
| 1-203010 | 8/1989 | Japan . | |
| 457924 | 12/1936 | United Kingdom ............ | 209/403 |
| 519680 | 4/1940 | United Kingdom ............ | 209/397 |
| 743902 | 1/1956 | United Kingdom ............ | 209/403 |
| 823648 | 11/1959 | United Kingdom . | |
| 1106513 | 3/1968 | United Kingdom . | |
| 1225849 | 3/1971 | United Kingdom . | |
| 1512958 | 6/1978 | United Kingdom . | |
| 2124099 | 2/1984 | United Kingdom . | |
| 89/10781 | 11/1989 | WIPO . | |

Primary Examiner—Thomas M. Lithgow
Attorney, Agent, or Firm—Joseph P. Gastel

[57] ABSTRACT

A screen assembly for a vibratory screening machine including a frame in the nature of a plate having spaced apertures therein, spaced frame members on opposite sides of the apertures, a screen formed in an undulating shape having substantially parallel ridges with downwardly sloping sides, troughs formed between the downwardly sloping sides for conducting material which is being screened, undersides on the troughs, bonds for securing the undersides of the troughs to the spaced frame members which are located on opposite sides of the apertures, and channels at the sides of the plate for securing the frame to a vibratory screening machine.

32 Claims, 6 Drawing Sheets

U.S. PATENT DOCUMENTS

| | | | |
|---|---|---|---|
| 2,723,032 | 11/1955 | Gisler | 209/401 |
| 2,726,184 | 12/1955 | Cox . | |
| 2,929,464 | 3/1960 | Sprouse . | |
| 2,957,235 | 10/1960 | Steinberg . | |
| 2,980,208 | 4/1961 | Neumaun . | |
| 3,057,481 | 10/1962 | Pall . | |
| 3,165,473 | 1/1965 | Pall . | |
| 3,255,885 | 6/1966 | Burls | 209/397 |
| 3,306,794 | 2/1967 | Humbert, Jr. . | |
| 3,374,886 | 3/1968 | Lightsey | 209/28 |
| 3,465,413 | 9/1969 | Rosaen et al. . | |
| 3,664,503 | 5/1972 | Felden | 209/397 |
| 3,747,772 | 7/1973 | Brown | 210/493 |
| 3,853,529 | 12/1974 | Boothe et al. . | |
| 4,019,987 | 4/1977 | Krasnow | 210/232 |
| 4,022,596 | 5/1977 | Pedersen . | |
| 4,033,865 | 7/1977 | Derrick | 209/275 |
| 4,064,051 | 12/1977 | Wehner . | |
| 4,075,106 | 2/1978 | Yamazaki | 210/487 |
| 4,380,494 | 4/1983 | Wilson | 209/403 |
| 4,512,892 | 4/1985 | Ganzi . | |
| 4,517,090 | 5/1985 | Kersten . | |
| 4,575,421 | 3/1986 | Derrick et al. | 209/397 |
| 4,594,162 | 6/1986 | Berger | 210/493.1 |
| 4,617,122 | 10/1986 | Kruse . | |
| 4,647,373 | 3/1987 | Tokar et al. | 210/232 |
| 4,696,751 | 9/1987 | Eifling | 209/402 |
| 4,701,197 | 10/1987 | Thornton . | |
| 4,746,339 | 5/1988 | Millard . | |
| 4,758,333 | 7/1988 | Masica et al. | 209/397 |
| 4,820,407 | 4/1989 | Lilie | 209/397 |
| 4,832,834 | 5/1989 | Baird, Jr. | 209/397 |
| 4,882,054 | 11/1989 | Derrick . | |
| 4,940,500 | 7/1990 | Tadokoro et al. . | |
| 4,954,249 | 9/1990 | Gero | 209/399 |
| 5,084,178 | 1/1992 | Miller . | |
| 5,139,154 | 8/1992 | Gero | 209/397 |
| 5,167,740 | 12/1992 | Michaelis . | |
| 5,221,008 | 6/1993 | Derrick, Jr. et al. | 209/269 |
| 5,230,455 | 7/1993 | Price . | |
| 5,312,508 | 5/1994 | Chisholm | 156/292 |

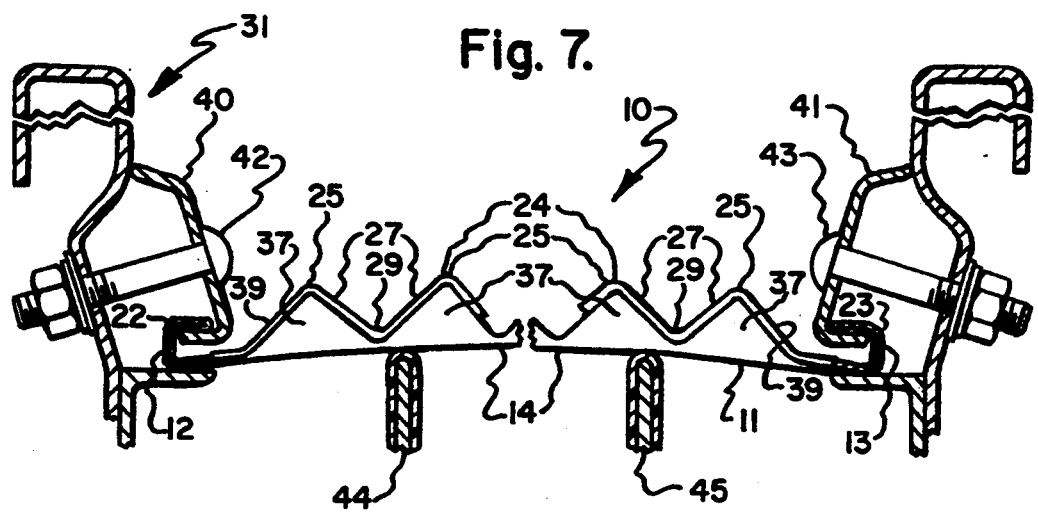
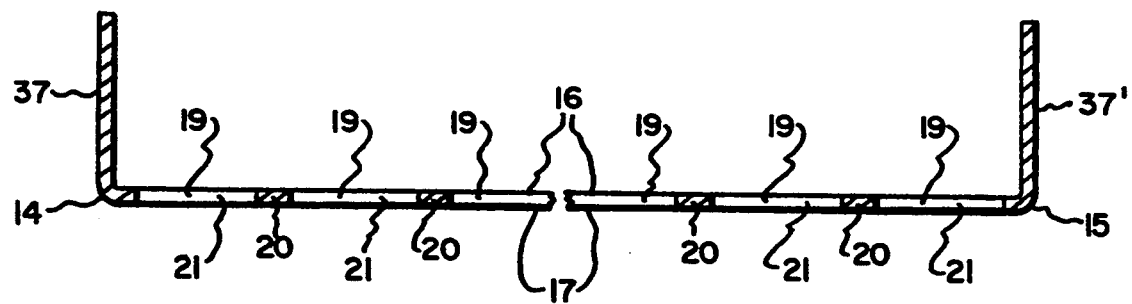
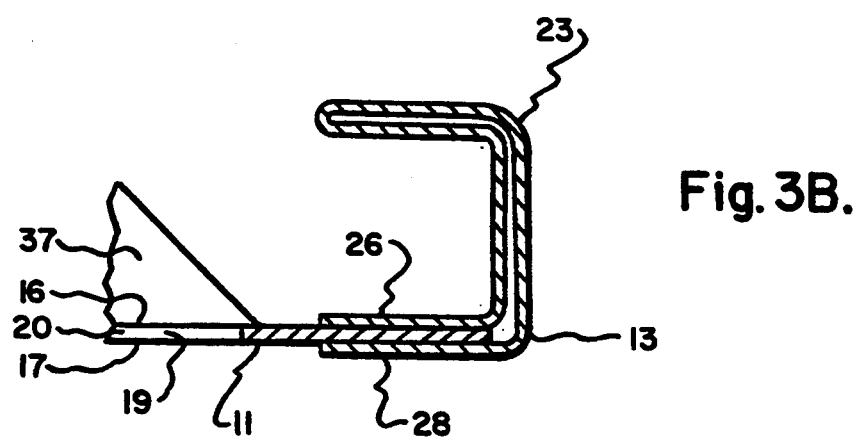

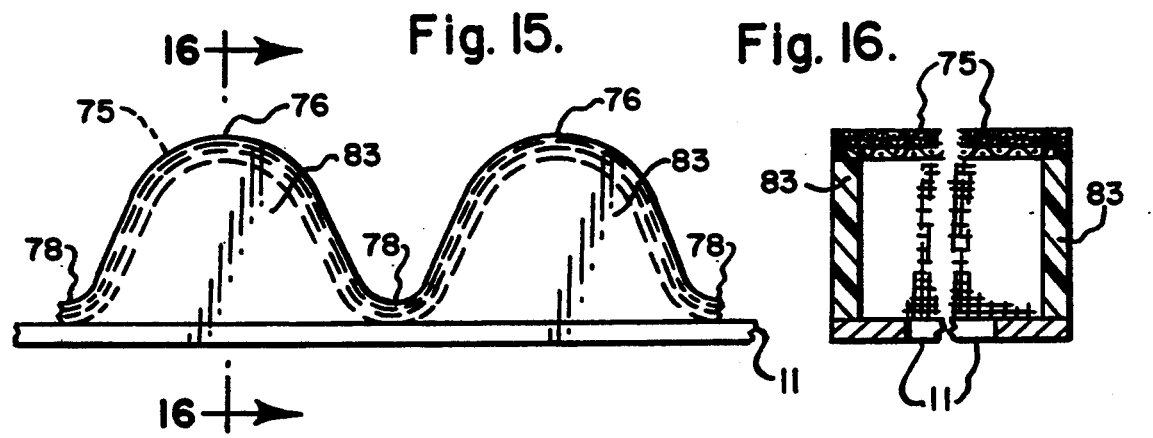
Fig. 15.
Fig. 16.
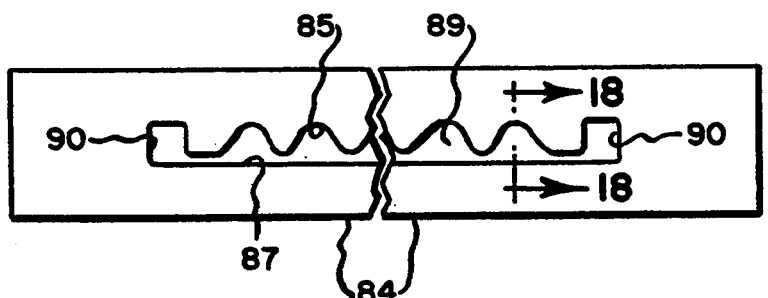
Fig. 17.
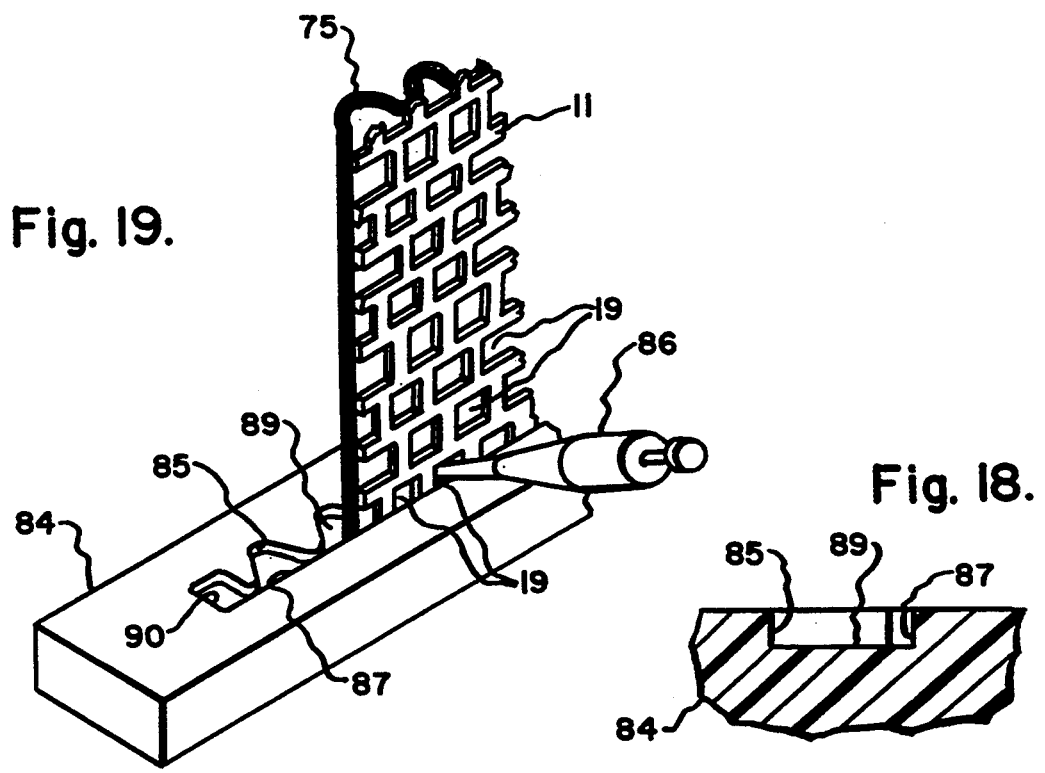
Fig. 19.
Fig. 18.

SCREEN ASSEMBLY FOR VIBRATING SCREENING MACHINE

CROSS REFERENCE TO RELATED APPLICATION

This application is a continuation-in-part of application Ser. No. 08/004,122, now abandoned, filed Jan. 13, 1993.

BACKGROUND OF THE INVENTION

The present invention relates to an improved screen assembly for a vibrating screening machine and to an improved method of screening material.

By way of background, in the screening of material on conventional flat screens which are mounted on a curved bed of a vibratory screening machine, the material being screened tends to migrate toward the lower sides of the screens. This lessens the efficiency of the screening operation.

SUMMARY OF THE INVENTION

It is the object of the present invention to provide an improved screen assembly for a vibrating screening machine which causes the material which is being screened to pass substantially in rows across the screen, without migrating toward the sides of the screen.

Another object of the present invention is to provide an improved screen for a vibratory screening machine which possesses more surface area than a flat screen and thus is more efficient in the amount of screening which it can perform per unit of time.

A further object of the present invention is to provide an improved screen assembly for a vibratory screening machine which is less susceptible to clogging or blinding because of the fact that the screen is of an undulating ridged configuration and thus the material being screened generally impinges the screen at an angle, and not perpendicularly.

Yet another object of the present invention is to provide an improved screen assembly which is of sufficiently rigid and strong construction so that it will be able to sustain the high G forces to which it is subjected, notwithstanding that the major part of the screen portion of the screen assembly is spaced from its supporting frame. Other objects and attendant advantages of the present invention will readily be perceived hereafter.

The present invention relates to a screen assembly for a vibratory screening machine comprising a frame, a plurality of apertures in said frame, spaced frame members on opposite sides of said plurality of apertures, a screen formed in an undulating shape with elongated substantially parallel ridges having downwardly sloping sides, troughs formed between said downwardly sloping sides for conducting material which is being screened, undersides on said troughs, securing means for securing said undersides of said troughs to said spaced frame members on the opposite sides of a plurality of said apertures, and means for securing said frame to a vibratory screening machine.

The present invention also relates to a method of screening material comprising the steps of providing a screen assembly having a frame with an undulating screen secured to said frame, said undulating screen having ridges and troughs and having first and second opposite ends on said ridges and troughs, depositing material to be screened proximate first ends of said ridges and troughs, and oscillating said screen assembly substantially only in a direction lengthwise of said ridges and troughs to cause said material deposited proximate said first ends of said ridges and troughs to travel lengthwise of said ridges and troughs toward said second ends of said ridges and troughs which are opposite to said first ends.

The various aspects of the present invention will be more fully understood when the following portions of the specification are read in conjunction with the accompanying drawings wherein.

BRIEF DESCRIPTION OF THE DRAWINGS

FIG. 3A is a fragmentary cross sectional view taken substantially along line 3A—3A of FIG. 1 with parts omitted in the interest of clarity;

FIG. 3B is a fragmentary enlarged cross sectional view taken substantially along line 3B—3B of FIG. 1;

FIG. 7 is a fragmentary end elevational view taken substantially in the direction of arrows 3—3 of FIG. 1 and showing, in addition, portions of the vibrating screen machine which support the screen assembly;

FIG. 15 is a fragmentary enlarged view of the end of the screen assembly taken substantially in the direction of arrows 15—15 of FIG. 12;

FIG. 16 is a fragmentary cross sectional view taken substantially along line 16—16 of FIG. 15;

FIG. 17 is a fragmentary plan view of a mold which is used in the process of sealing the open ends of the ridges of the screen;

FIG. 18 is a fragmentary cross sectional view taken substantially along line 18—18 of FIG. 17; and FIG. 19 is a fragmentary perspective view of the open ends of the ridges being sealed.

DESCRIPTION OF THE PREFERRED EMBODIMENTS

Figure 1:
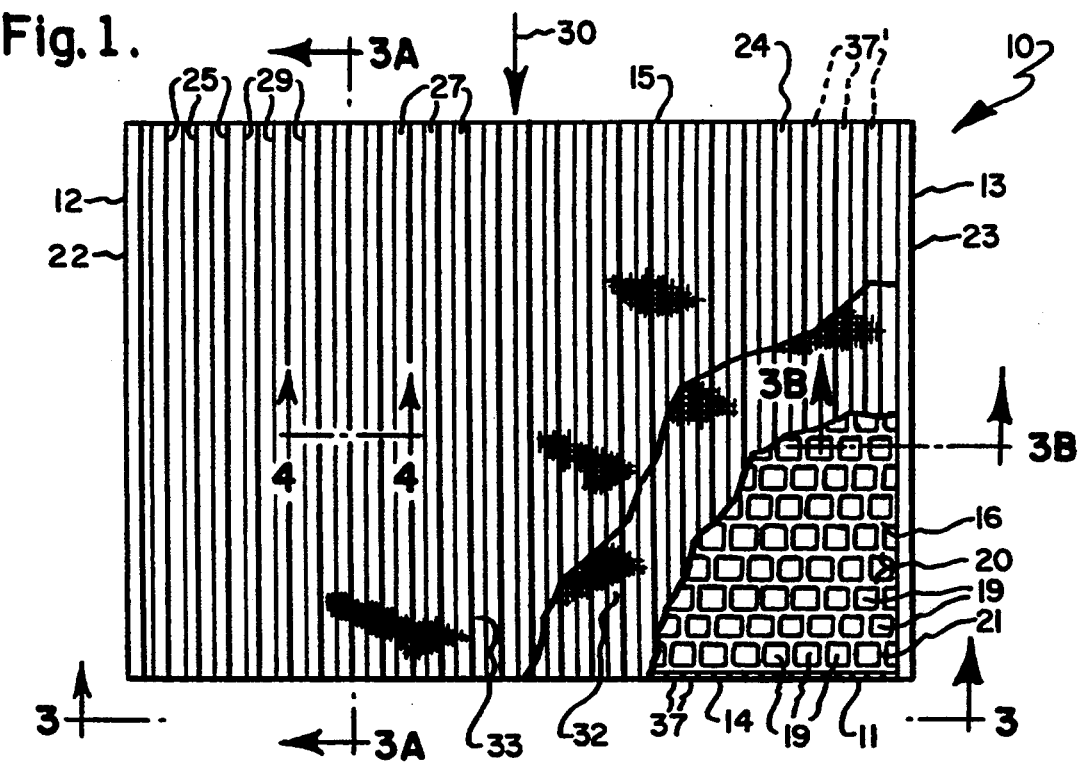
FIG. 1 is a plan view of one embodiment of the improved screen assembly of the present invention with portions broken away to show the various layers thereof.
Figure 2:
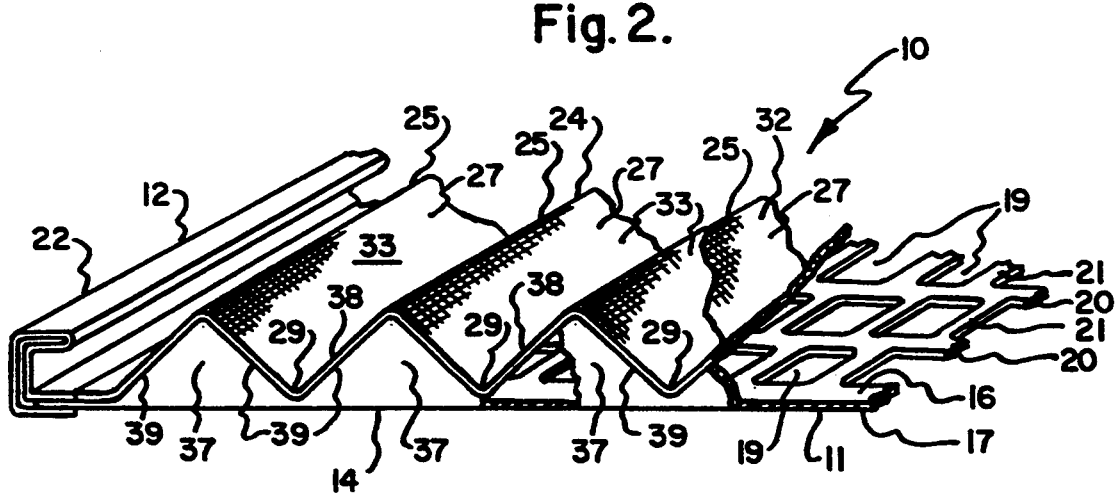
FIG. 2 is a fragmentary enlarged perspective view taken substantially in the direction of arrows 3—3 of FIG. 1.
Figure 3:
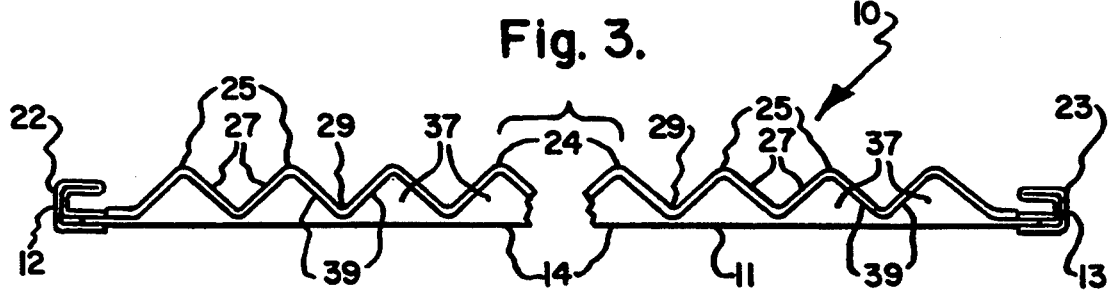
FIG. 3 is an end elevational view taken substantially in the direction of arrows 3—3 of FIG. 1.
Figure 4:
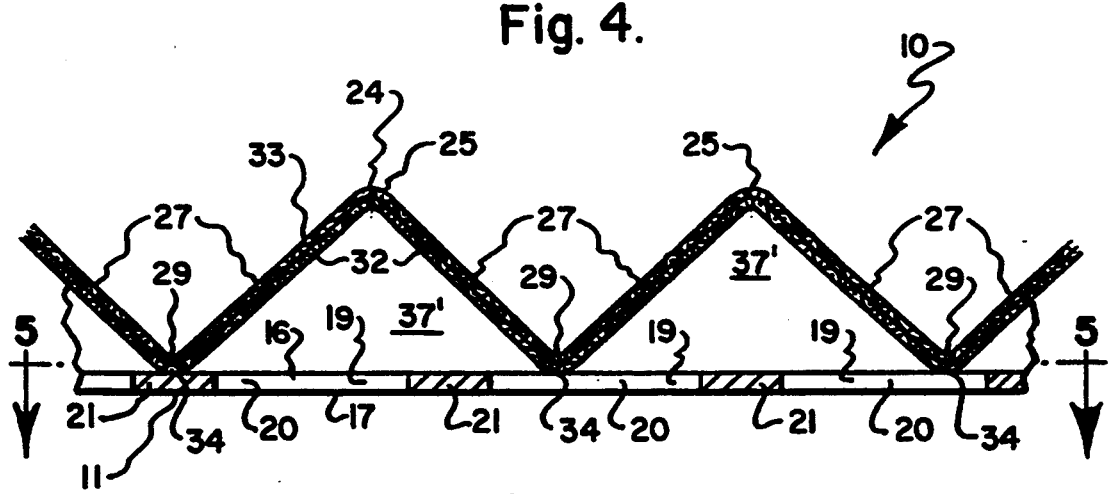
FIG. 4 is an enlarged fragmentary cross sectional view taken substantially along line 4—4 of FIG. 1.

One embodiment of the improved screen assembly 10 is shown in FIGS. 1–8, and it includes a frame in the form of a perforated metal plate 11, such as steel or any other suitable metal, having a first pair of opposite edges 12 and 13 and a second pair of opposite edges 14 and 15 and an upper surface 16 and a lower surface 17. Plate 11 includes apertures 19 which are bordered by elongated metal strip-like portions or members 20 which extend between edges 12 and 13 and by shorter strip-like portions 21 which extend lengthwise between elongated strip-like portions 20. The openings 19 are formed by a punching operation and are quadrangles of approximately 1 inch square with rounded corners but they may be any other desired shape or size. Strip-like portions 20 and 21 are approximately 1/10 of an inch wide, but they may be of any desired width. The length of plate 11 between edges 12 and 13 may be approximately 3½ feet and its width between edges 14 and 15 may be approximately 2½ feet, and it may have a thickness of about 1/16 of an inch. However, it will be appreciated that the size of plate 11 may vary as required to fit different machines. The width of each opening 19 is a small fraction of the length of the plate between edges 12 and 13. The same is true of the relationship between the height of openings 19 and the width of the plate between edges 14 and 15. Channel-shaped members 22 and 23 are constructed as shown in FIG. 3B and are welded to plate 11 at edges 12 and 13, respectively. More specifically, channel-shaped member 23 is bent to the shape shown in FIG. 3B from a single piece of metal and its ends 26 and 28 are oriented in bracketing relationship to the edge of plate 11 and are welded thereto. Channel-shaped member 22 is of the same construction and is welded to plate 11 in the same manner. The foregoing description of plate 11 is essentially set forth in U.S. Pat. No. 4,575,421. As will be apparent hereafter, any suitable plate or any suitable frame which provides the frame portions or members to which a screen can be attached may be utilized.

In accordance with the present invention, the screen 24 is corrugated in the sense that it is formed in an undulating triangular shape having elongated substantially triangular parallel ridges 25 with downwardly sloping sides 27. Troughs 29 are formed between the downwardly sloping sides for conducting material which is being screened in the direction of arrow 30 (FIGS. 1 and 6) across the width of the screen in substantially parallel rows. This prevents the material being screened from gravitating toward the sides 12 and 13 when the screen assembly 10 is mounted in bowed condition on a vibratory screening machine 31, as schematically depicted in FIG. 7.

Figure 5:
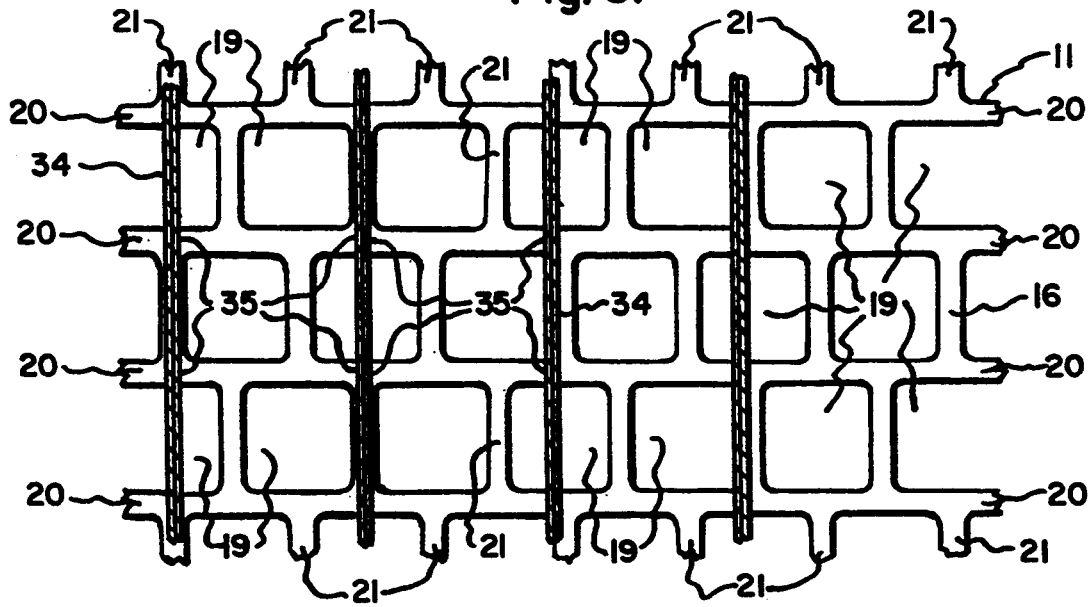
FIG. 5 is a cross sectional view taken substantially along line 5—5 of FIG. 4.

The screen 24 includes a coarse support screen 32 having bonded thereto a fine screening screen 33. Coarse screen 32 may be anywhere between 4 and 24 mesh, or any other suitable size. The fine screening screen 33 may be between 50 and 400 mesh or any other suitable size. The coarseness of the support screen and the fineness of the fine screening screen which are used in any application would depend on the material being screened, and whether the screening is being effected dry or wet. The fine screening screen 33 is bonded to the coarse support screen 32 at points where their wires intersect by a suitable adhesive such as epoxy. In addition, wherever the apices 34 (FIGS. 4 and 5) cross over elongated frame members 20, they are adhesively bonded thereto by epoxy. Thus, there will be a bond to thereby firmly secure screen 24 to plate 11 so that it can withstand the high G forces to which it is subjected. Thus, for example, there will be bonds at points such as 35 (FIG. 5). However, any other suitable securing arrangement for rigidly securing screen 24 to plate 11 may be used.

The screen 24 is formed on a brake to the triangular shape shown after screens 32 and 33 are bonded to each other. In the present instance, the sides 27 extend at a 45° angle to plate 11 and thus the angle between sides 27 will be 90°. However, sides 27 can extend at any desired angle relative to each other. Additionally, the undulating shape need not be triangular but it may be sinusoidal or any other suitable cross sectional configuration which will provide elongated substantially parallel ridges with troughs therebetween. Thus, the vertices at the lowermost portions of the troughs 29 need not be a sharp angle as shown but can be curved.

The supporting screen 32 need be sufficiently strong to maintain the integrity of the undulating shape to bear the brunt of any rocks and heavy debris to which the screen is subjected. Furthermore, the coarse support screen 32 need be of a sufficiently close mesh so as to prevent tearing of the screening screen 33 which lies on top of it.

The sides 14 and 15 of plate 11 are formed into triangles 37 and 37', respectively, which are bent up at a right angle to the main body of the plate, and the edges of the triangles 37 are sealed, as by adhesive or welding, to the end edges 38 of the undulating ridges at 39 to thereby completely close the ends of ridges 25. This prevents the material from being screened from entering the openings closed by triangles 37. Any other suitable arrangements can be utilized for blocking the ends of the ridges 25.

The screen assembly 10, in addition to channeling screening material through troughs 29, also provides a greater screening surface than a flat screen, such as shown in U.S. Pat. No. 4,575,421. In this respect, depending on the triangular configuration, the screening area is a multiple of the screening area of the screen shown in the prior patent. In the specific embodiment shown where the sides 27 are at an angle of 45° to the plate, the screen has approximately 1.8 times the screening area of a flat screen. In addition, because the sides 27 are at an angle and because the oscillation of the screen is in a vertical direction, there is less blinding because the particles which are moved up and down hit the screening screen 33 at an angle rather than perpendicularly, as would be the case with a flat screen. In operation, the particles do not gravitate into the bottoms of the troughs 29 but they are distributed along the sides 27. It is actually the sides 27 which guide the particles in the direction of the troughs 29.

Figure 6:
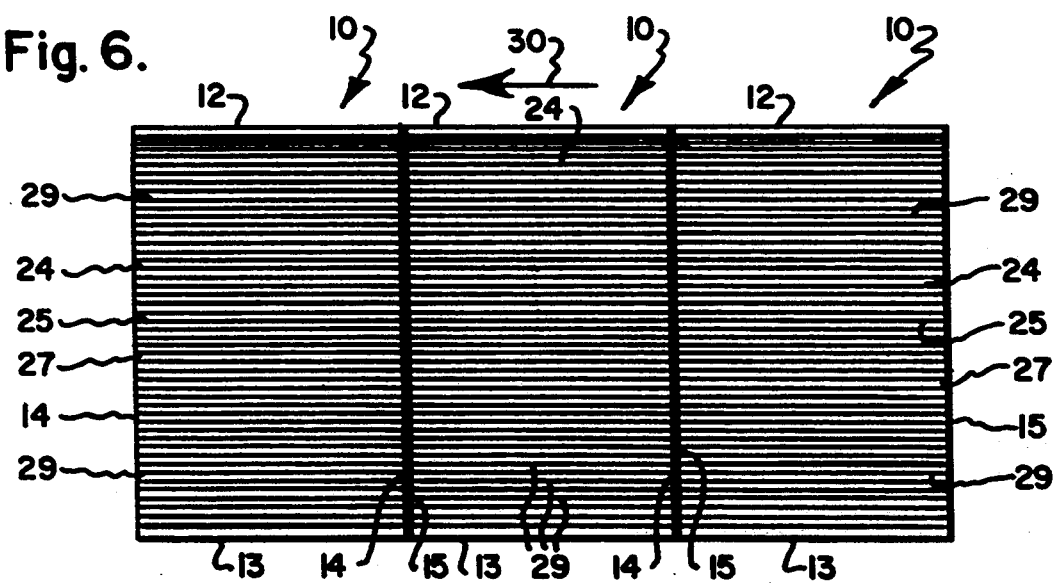
FIG. 6 is a plan view of a plurality of screen assemblies of FIG. 1 shown in alignment, as they would be on the bed of a vibratory screening machine.

In FIG. 6 there is a schematic showing of three screens 10 in perfect alignment with each other, that is, the troughs 29 of each of the screens and the ridges 24 of each of the screens are in alignment so that the material to be screened which is traveling in the direction of arrow 30 will pass from one screen to the next without being obstructed by the ends of the screens which are blocked by triangles 37 and 37'.

The screen assembly 10 can be mounted in a vibrating screening machine 31 by means of elongated channel-shaped drawbars 40 and 41 which engage channels 22 and 23, respectively, and are drawn up by means of nut and bolt assemblies 42 and 43, respectively, as is well known in the art. Screen assembly 10 rests on a frame (not fully shown) having a plurality of elongated members 44 and 45 extending parallel to channels 22 and 23. In its operative position, screen assembly 10 is bowed slightly so that its center along a line parallel to edges 12 and 13 is higher than the outer edges 12 and 13, as is well known. However, the screen assembly 10 can be mounted in any other manner by any other type of mounting arrangement, depending on the machine in which it is used. In addition, in certain instances, the screen assembly 10 may be mounted flat or, if a different type of frame is utilized rather than the plate 11, the frame may be mounted in any suitable manner, depending on the machine.

In use, the screen assembly 10 may be inclined downwardly from upper edge 15 to lower edge 14 or it may be horizontal, or it may be inclined upwardly from edge 15 to edge 14. Material is fed onto the screen at edge 15 and it passes toward edge 14 as screen assembly 10 is vibrated in the conventional manner. In this respect, the vibration is an oscillation in the plane of the direction of arrows 30 (FIGS. 1 and 6), that is it is in the same direction as the flow of the material which is being screened. More specifically, the oscillation is in a forward and rearward direction coupled with an up and down motion, but there is no appreciable sidewise motion. The oscillation is effected under high G forces between about 2G and 9G, depending on the material being screened. It is for this reason, namely, the high G forces that the frame 11 has to be sufficiently strong, and the support screen 32 has to be sufficiently strong to support the expanses of screening screen 33 bonded thereto, and support screen 32 has to be bonded at multiple points along its length to prevent it from being detached from the plate 11 during oscillation.

Figure 8:
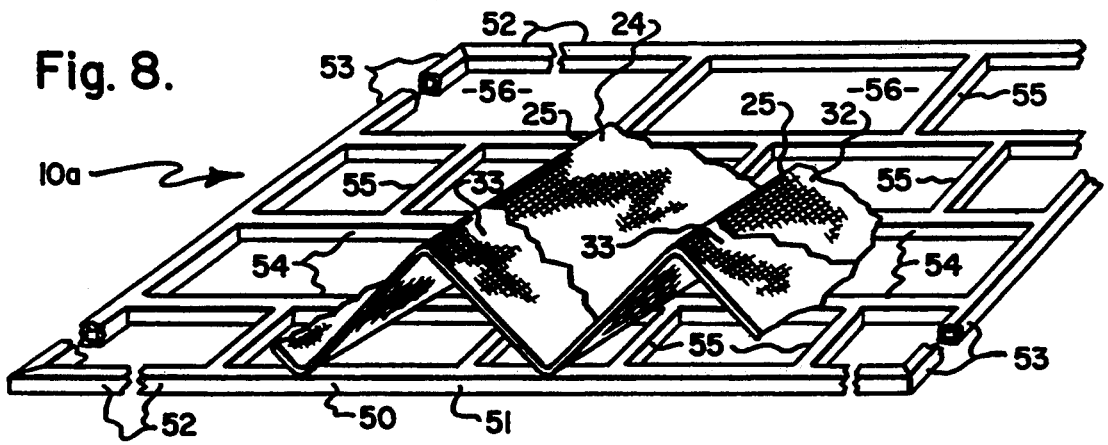
FIG. 8 is a fragmentary perspective view of another embodiment of the present invention.

Another embodiment of the improved screen assembly is shown in FIG. 8. Screen assembly 10a utilizes a metal frame 50 consisting of a rectangular outer frame 51 consisting of two tubular members 52 and two tubular members 53. Tubular frame members 54 extend lengthwise between and are suitably secured to the two members 53 and tubular members 55 extend lengthwise between and are suitably secured to tubular members 54. Adjacent tubular members 55 are not aligned with each other, so that screened material will not travel along one member 55 onto another member 55. A screen 24 is provided having a coarse screen 32 with a fine screen 33 bonded thereto, as described in FIGS. 1–8. Screen 24 is adhesively bonded to tubular members 54. The frame members 54 and 55 define apertures 56 therebetween through which screened material passes after it has been screened by screen 24. Suitable channels, such as 22 and 23 (FIGS. 1–8), may be welded to frame members 53 for mounting screen assembly 10a on a vibratory screen machine, or any other suitable mounting arrangement can be used. The screen assembly 10a is suited for mounting on a vibratory screening machine having a flat bed, considering that the tubular frame 51 is not flexible like plate 11 of FIGS. 1–8. It is to be noted that triangular plates, such as 37 of FIGS. 1–8, cannot be used to block off the ends of the ridges 25 but other blocking arrangements, such as described hereafter with other embodiments, can be used. While the frame 50 has been described above as being fabricated of tubular members, it will be appreciated that under certain circumstances it may be fabricated of solid rods if the weight is not excessive.

Figure 9:
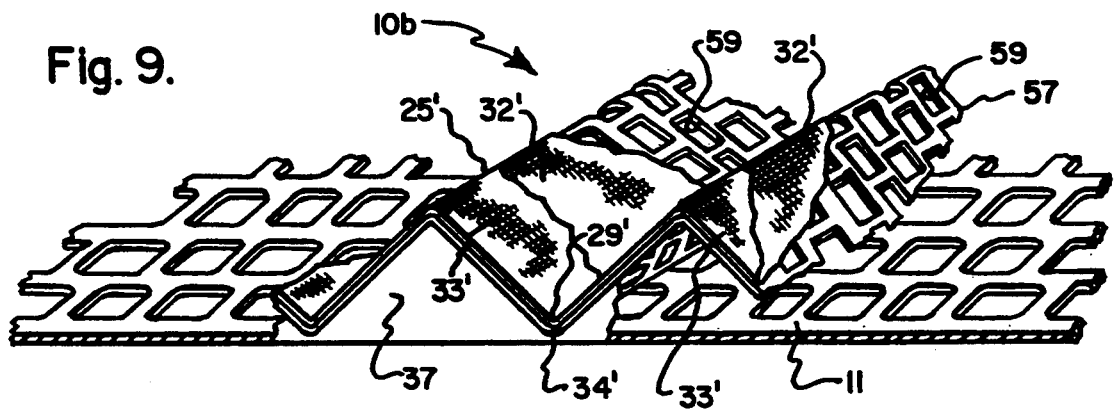
FIG. 9 is a fragmentary perspective view of still another embodiment of the present invention.

Another embodiment 10b is shown in FIG. 9. This embodiment includes a perforated plate which may be identical to plate 11 of FIGS. 1–8 and which has suitable channels, such as 22 and 23, affixed thereto for mounting the screen assembly 10b on a vibratory screening machine. In this embodiment, a coarse screen 32' and a fine screen 33' are bonded, as by epoxy adhesive, to a perforated plate 57 having apertures 59 therein. Plate 57 and screens 32' and 33' are bent into an undulating shape having ridges 25' and troughs 29'. The troughs 29' terminate at apices 34'. The undersides of apices 34' are welded or otherwise suitably bonded at spaced locations along their lengths to plate 11 in the same manner described above relative to FIGS. 2–8. Plate 11 may include bent up triangles 37 for blocking the ends of ridges 25 in the same manner described above relative to FIGS. 2–8. The purpose for utilizing a perforated plate 57 is to lend strength to the screens 32' and 33' against deformation by rocks. In this embodiment, if desired, only one screening screen may be bonded to plate 57 if plate 57 lends sufficient support to it. In fact in any of the embodiments, a single screen can be bonded to the frame at various points along the lengths of the troughs if the screen is sufficiently strong to withstand the forces which are applied to it, and this would generally apply to screens which have relatively large wire sizes, such as screens which are between about 10 and 50 mesh which will not distort excessively when subjected to the forces produced by the vibratory screening machine.

Figure 10:
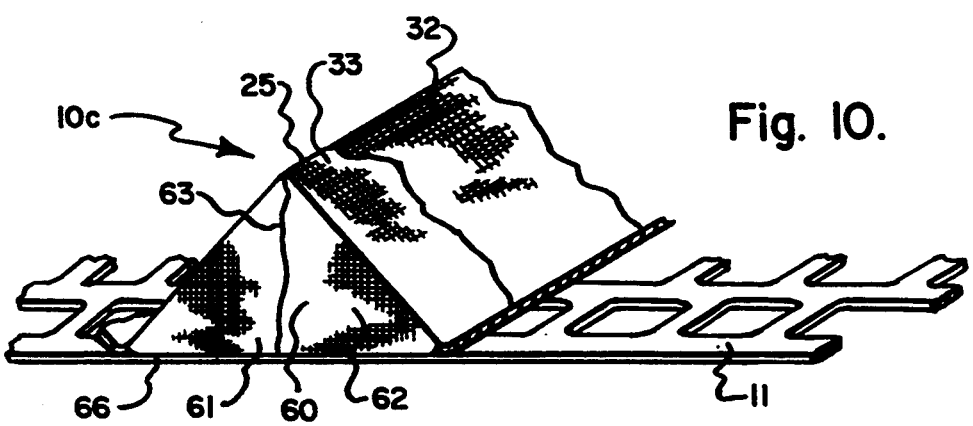
FIG. 10 is a fragmentary perspective view of yet another embodiment of the present invention.

In FIG. 10 a further modified screen assembly 10c is shown. This assembly may take the form of any of the preceding screens except that it does not have the folded-up triangular ends 37 for blocking the openings to ridges 25. Instead, both screens 32 and 33 are bent over at the ends of the ridges 25 to form a cover 60 by joining portions 61 and 62 by a seam 63, which may be formed by adhesive or welding or brazing or in any other suitable manner. The lowermost side of cover 60 is sealed to plate 11 along joint 66. This arrangement for sealing the ends of ridges 25 may be utilized in any of the preceding embodiments 10, 10a and 10b.

Figure 11:
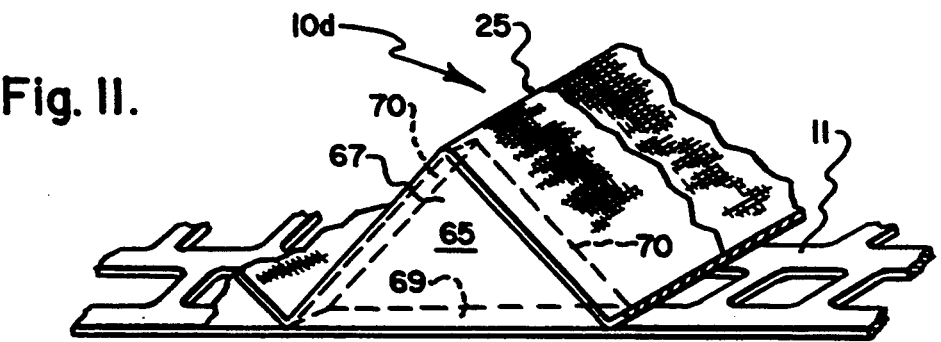
FIG. 11 is a fragmentary perspective view of still another embodiment of the present invention.
Figure 12:
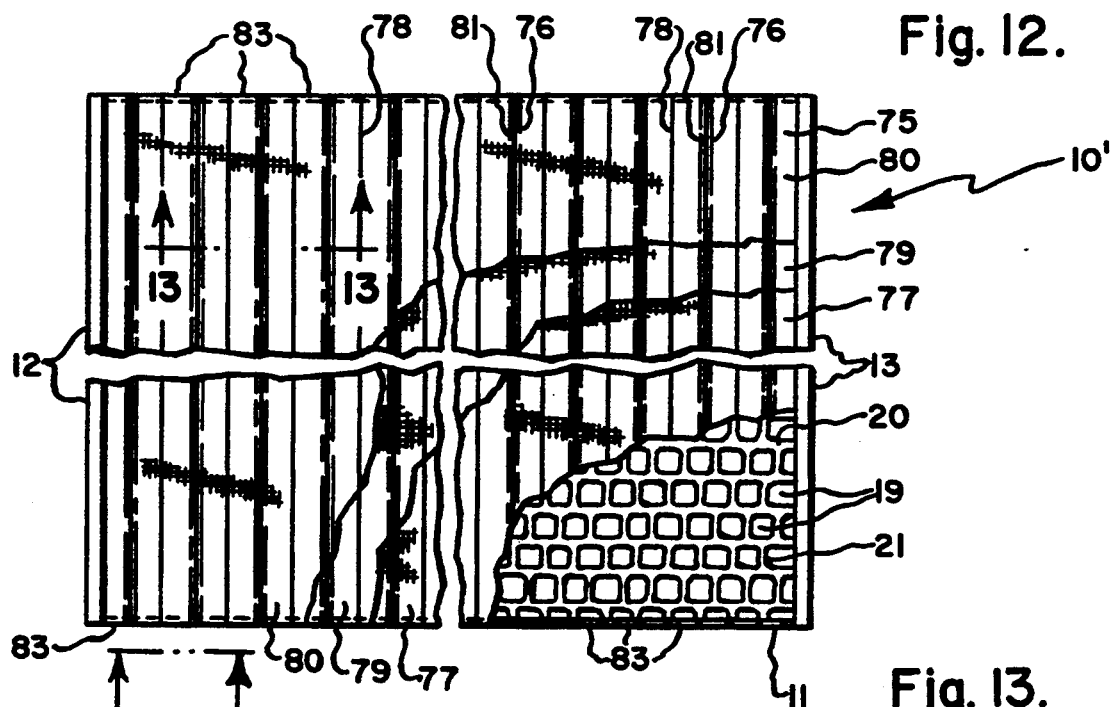
FIG. 12 is a fragmentary plan view of another embodiment of the present invention.
Figure 13:
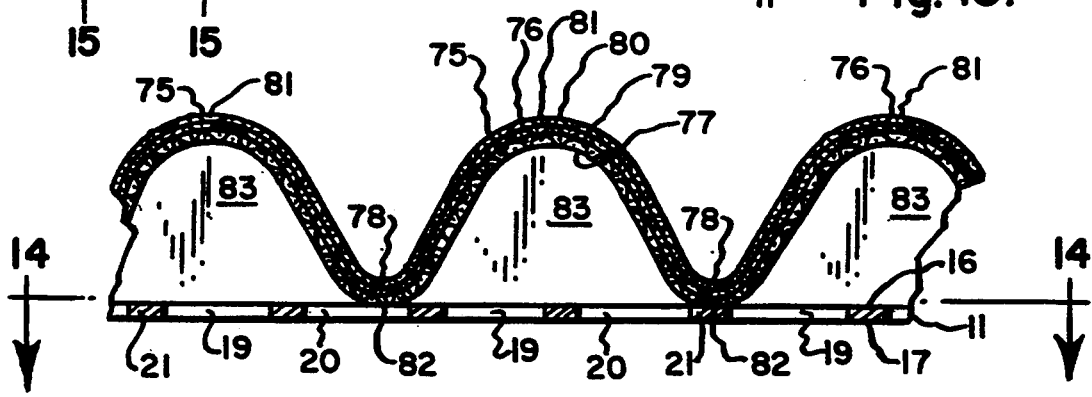
FIG. 13 is a fragmentary enlarged cross sectional view taken substantially along line 13—13 of FIG. 12.
Figure 14:
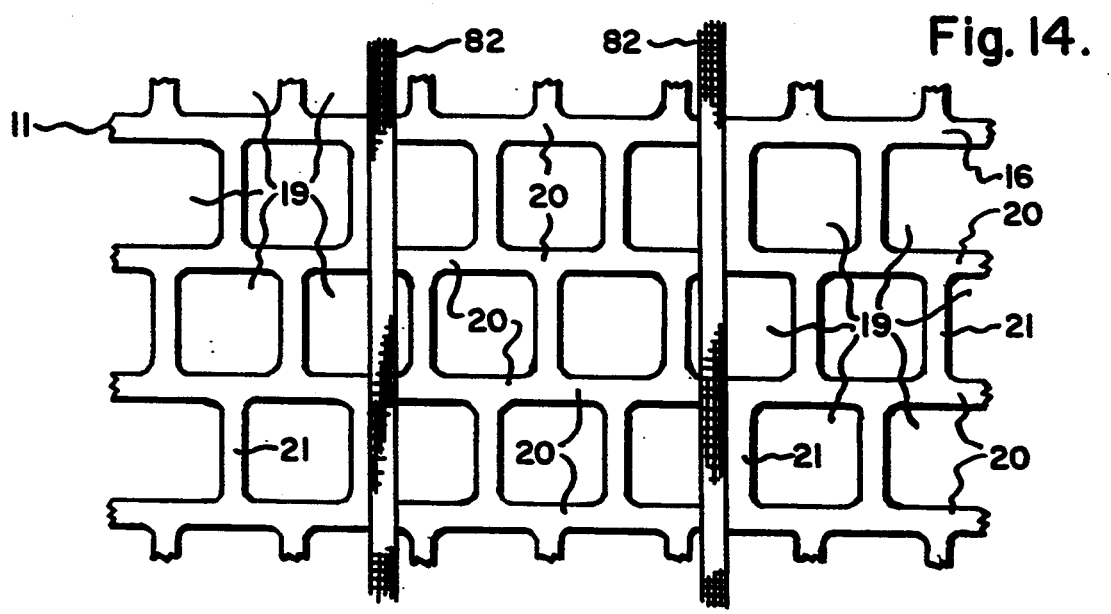
FIG. 14 is a fragmentary cross sectional view taken substantially along line 14—14 of FIG. 13.

In FIG. 11 a further modified screen assembly 10d is shown which utilizes a triangular plastic insert 65 to seal the end of ridges, such as 25. The plastic insert can consist of a triangular portion 67 having flanges 69 and 70, respectively, which are placed in contiguous abutting lapped relationship with the inner end edge surfaces of plate 11 and ridges 25, respectively. Suitable adhesive or sealant, such as epoxy, bonds flanges 69 and 70 in position. Plastic plates 65 may be utilized in any of the preceding embodiments.

In FIGS. 12–19 a preferred embodiment of the present invention is disclosed. This embodiment comprises a screen assembly 10' which includes a frame in the form of a perforated metal plate 11 which may be identical to plate 11 described above with respect to FIGS. 1–8, and accordingly the same numerals will be applied to this plate, and a description will be omitted at this point in the interest of brevity. It will be understood that the numerals on this plate which are identical to the numerals of the plate of FIGS. 1–8 represent identical elements of structure.

The screen assembly 10' of FIGS. 12–19 differs from the preceding embodiment shown in FIGS. 1–8 in that the corrugated screen 75 of screen assembly 10' is of an undulating curved shape rather than an undulating triangular shape. In addition, it possesses three layers of screening instead of the two layers shown in FIGS. 1-8. More specifically, the screen 75 comprises a base screen 77, an intermediate screen 79 and an uppermost screen 80. These screens are formed into an undulating curved shape which includes curved ridges 76 and curved troughs 78. Screens 77, 79 and 80 are bonded to each other by epoxy at their contacting areas, that is, where the wires of each screen contact the wires of the screen which is contiguous thereto. The undersides 82 of the troughs 78 are bonded to plate 11 by epoxy wherever they cross portions 20 and 21 of plate 11. Base screen 77 is in the nature of a supporting screen and it may have a mesh size of between about 3 mesh and 8 mesh. The intermediate screen 79 may have a mesh size of between 30 mesh and 325 mesh. The uppermost screen 80 is of finer mesh than intermediate screen 79 and it may have a mesh size of between 40 mesh and 400 mesh. Preferably the intermediate screen 79 should be two U.S. sieve sizes coarser than the uppermost screen 80.

The open ends of the ridges 76 of screen 75 are sealed or blocked by polyurethane caps 83 which are molded into place. To accomplish this, a screen assembly consisting of plate 11 with screen 75 bonded thereto is oriented vertically, and an end of the screen is placed into a mold 84. In this mold, the screen 75 is placed in contiguous abutting complementary relationship with curved surface 85, and the edge of plate 11 is placed in abutting relationship with edge 87 of the mold. The end surfaces of the screen 75 and plate 11 are placed in abutting relationship with the planar bottom 89 of the mold, and the channel-shaped side edges 12 and 13 of plate 11 are placed in mating openings 90 of the mold 84. Liquid polyurethane is then pumped into the open end of each ridge to the proper depth by inserting the pump 86 through the aperture 19 in the plate 11 which is proximate to the open end of the ridge 76 which is to be blocked, and the liquid polyurethane is filled to the proper depth in the mold. This is shown in FIG. 18. The polyurethane penetrates the screen 75 and also adheres to the plate 11, and after the polyurethane solidifies, a cap 83 is firmly bonded to the open end of each ridge 76. The caps 83, in addition to serving their blocking function, also rigidize the edges of the screen 75.

Since screen 75 is of curved shape, its crests 81 are rounded, as compared with the pointed crests or apices of the triangular screen of FIGS. 1-8. Also, the apices 82 at the undersides of troughs 78 are rounded which provides more contact area with plate 11 than is possible with the apices 34 of the triangular screen of FIGS. 1-8. The undersides 82 of troughs 78 are bonded to the contacting portions of plate 11 by means of epoxy, as noted above. Since apices 82 have an effective wider tread than apices 34 of FIGS. 1-8, more secure bonding is obtained wherever the contact exists. Additionally, the rounded crests or apices 81 provide longer life because there are no acute stress areas due to sharp bends. Additionally, the screen according to FIGS. 12-19 provides improved performance because the material which is being screened does not slide sideways as rapidly from the curved crests or apices 81 and because there is a broader base at the bottoms 83 of the curved troughs and thus less clogging.

A screen which has proved satisfactory in operation had the following dimensions: The plate 11 had the dimensions set forth above relative to FIGS. 1-8. The base screen 77 was 4 mesh, the intermediate screen 79 was 180 mesh and the uppermost screen 80 was 200 mesh. Curved screen 75 had a dimension of 1.6 inches between cycles, that is 1.6 inches between adjacent crests and 1.6 inches between the bottom of adjacent troughs. Also, the radii at the bottoms of the troughs was ¼ inch and the radii at the crests 81 was ½ inch. The height of the ridges from plate 11 to the tops 81 was one inch. It will be appreciated that the curvature may be of any desired dimension which will provide the proper results.

The use of a triple layer consisting of screens 77, 79 and 80 produces certain advantages. The base screen 77 provides rigidity without significantly blocking the openings in the two screens 79 and 80 which lie above it. Intermediate screen 79 provides support to uppermost screen 80 and it in turn is supported by base Screen 77.

While the preferred way of blocking the open ends of the screen 10' has been described above by the polyurethane caps 83, the ends of screen 75 can be blocked by any of the structures disclosed above. More specifically, the open ends can be blocked by suitably shaped tabs such as 37 of FIG. 2 bent up from plate 11. Also, the open ends of the screens can be blocked by the method shown in FIG. 10 or by suitably shaped plastic inserts of the type shown and described above relative to FIG. 11.

The screen assemblies described above can be utilized for dry screening, or can be utilized for wet screening of drilling mud which is a slurry of mud and water, and it can also be utilized for other liquid suspensions, such as kaolin and water. A machine of the type which performs a wet screening operation is disclosed in U.S. Pat. No. 4,882,054.

It can thus be seen that the improved screen assemblies of the present invention are manifestly capable of achieving the above-enumerated objects, and while preferred embodiments of the present invention have been disclosed, it will be appreciated that it is not limited thereto but may be otherwise embodied within the scope of the following claims.

What is claimed is:

1. A screen assembly for a vibratory screening machine said assembly comprising a substantially planar plate, a plurality of apertures in said plate, elongated spaced plate members on opposite sides of said plurality of apertures, a screen formed in an undulating shape with elongated substantially parallel ridges having sloping sides, troughs formed between said sloping sides for conducting material which is being screened, and undersides on said troughs, said undersides being bonded to said spaced plate members on the opposite sides of a plurality of said apertures with said sloping sides of said ridges extending away from and being spaced from said plate members and being spaced from and overlying said plurality of apertures.

2. A screen assembly as set forth in claim 1 wherein said plate has a length and a width, and wherein said plurality of apertures comprise a plurality of apertures extending in the direction of said length and a plurality of apertures extending in the direction of said width.

3. A screen assembly as set forth in claim 1 wherein said screen comprises an undulating coarse supporting screen, and an undulating fine screening screen bonded to said coarse screen on the opposite side of said coarse screen from said plate.

4. A screen assembly as set forth in claim 3 wherein said plate has a length and a width, and wherein said plurality of apertures comprise a plurality of apertures extending in the direction of said length and a plurality of apertures extending in the direction of said width.

5. A screen assembly as set forth in claim 3 wherein said screen further comprises an apertured plate formed in the same undulating shape as said coarse and fine screens and located in underlying relationship to said coarse supporting screen and bonded to said substantially planar plate.

6. A screen assembly as set forth in claim 1 wherein said screen comprises an undulating screening screen and an apertured plate formed in the same undulating shape as said screening screen and located in underlying relationship thereto and bonded to said substantially planar plate.

7. A screen assembly as set forth in claim 1 wherein said elongated ridges have end portions, and sealing means for sealing said end portions of said elongated ridges against entry of material which is being screened.

8. A screen assembly as set forth in claim 7 wherein said sealing means comprise bent-up portions of said plate.

9. A screen assembly as set forth in claim 7 wherein said sealing means comprises extensions of said screen covering said end portions of said ridges.

10. A screen assembly as set forth in claim 7 wherein said sealing means comprises inserts installed in said end portions of said ridges.

11. A screen assembly as set forth in claim ,.wherein said screen comprises an undulating coarse supporting screen, and an undulating fine screening screen bonded to said coarse screen on the opposite side of said coarse screen from said plate.

12. A screen assembly as set forth in claim 11 wherein said plate has a length and a width, and wherein said plurality of apertures comprise a plurality of apertures extending in the direction of said length and a plurality of apertures extending in the direction of said width.

13. A screen assembly as set forth in claim 1 wherein said elongated ridges are of triangular cross sectional shape.

14. A screen assembly as set forth in claim 7 wherein said screen comprises a coarse supporting screen for placement adjacent said apertured plate, and a fine screening screen bonded to said coarse screen on the opposite side of said coarse screen from said apertured plate.

15. A screen assembly as set forth in claim 1 wherein said plate members extend crosswise to said ridges and said troughs, and wherein said undersides of said troughs are secured at spaced locations to said frame members.

16. A screen assembly as set forth in claim 15 wherein said undersides of said troughs are bonded to said plate members by epoxy.

17. A screen assembly as set forth in claim 1 wherein said ridges have apices which are rounded.

18. A screen assembly as set forth in claim 1 wherein said undersides of said troughs are curved.

19. A screen assembly as set forth in claim 1 wherein said screen comprises an undulating base screen of relatively large mesh, an undulating top screening screen of fine mesh, and an undulating intermediate screening screen of less fine mesh than said top screen, said intermediate screen being located between said base screen and said top screen.

20. A screen assembly as set forth in claim 17 wherein the bottoms of said troughs are curved and said undersides of said troughs are curved.

21. A screen assembly as set forth in claim 18 wherein said elongated ridges have end portions, and means for sealing said end portions of said elongated ridges against entry of material which is being screened.

22. A screen assembly as set forth in claim 1 wherein said screen comprises an undulating base screen of relatively large mesh, an undulating top screening screen of fine mesh, and an undulating intermediate screening screen of less fine mesh than said top screen, said intermediate screen being located between said base screen and said top screen.

23. A screen assembly as set forth in claim 22 wherein the bottoms of said troughs are curved and said undersides of said troughs are curved.

24. A screen assembly as set forth in claim 1 including sealing means for sealing said end portions of said elongated ridges against entry of material which is being screened, said sealing means comprising molded cap members which are molded into place in said ridges.

25. A screen assembly as set forth in claim 24 wherein said molded cap members penetrate said screen and adhere to said plate.

26. A screen assembly as set forth in claim 24 wherein said undersides of said troughs are curved.

27. A screen assembly as set forth in claim 26 wherein said screen comprises an undulating base screen of relatively large mesh, an undulating top screening screen of fine mesh, and an undulating intermediate screening screen of less fine mesh than said top screen, said intermediate screen being located between said base screen and said top screen.

28. A screen assembly as set forth in claim 1 wherein said plate members comprise strip-like members on said apertured plate, and wherein said undersides of said troughs are bonded to said strip-like members by epoxy.

29. A screen assembly as set forth in claim 28 wherein said undulating screens comprises a plurality of screens of different mesh size bonded together.

30. A screen assembly for a vibratory screening machine said assembly comprising a substantially planar plate, a plurality of apertures in said plate, said plate comprising elongated spaced plate members on opposite sides of said plurality of apertures, a screen formed in an undulating shape with elongated substantially parallel ridges having downwardly sloping sides, troughs formed between said downwardly sloping sides for conducting material which is being screened, undersides on said troughs, bonding means for bonding said undersides of said troughs to said spaced plate members on the opposite sides of a plurality of said apertures, means for securing said substantially planar plate to a vibratory screening machine, said undulating screen comprising an undulating screening screen and an undulating apertured plate formed in the same undulating shape as said screening screen and located in underlying relationship thereto and bonded to said substantially planar plate.

31. A screen assembly for a vibratory screening machine comprising a substantially planar plate having a length and a width, an area defined by said length and width, a plurality of first plate members on said plate extending in the direction of said length, a plurality of second plate members on said plate extending in the direction of said width, a plurality of apertures defined by said first and second plate members with said plurality of apertures extending both in said direction of said length and said direction of said width, a screen formed in an undulating shape to provide a screening area which is larger than said area of said plate, said undulating screen including a plurality of alternating parallel ridges and troughs, said ridges further including side walls extending toward said plate and defining said troughs, undersides on said plurality of troughs, said undersides of said plurality of troughs being bonded to certain of said plate members where said undersides of said troughs overlie said certain of said plate members, and said plurality of ridges which comprise said screening area which is larger than the area of said plate being oriented in spaced relationship to said plate and being spaced from and overlying said plurality of apertures.

32. A screen assembly as set forth in claim 31 wherein said first and second plate members comprise first and second strip-like members, respectively.

* * * * *

UNITED STATES PATENT AND TRADEMARK OFFICE
CERTIFICATE OF CORRECTION

PATENT NO. : 5,417,858
DATED : May 23, 1995
INVENTOR(S) : William W. Derrick et al It is certified that error appears in the above-indentified patent and that said Letters Patent is hereby corrected as shown below:

Column 8, line 41 (claim 1), before "said" insert --,--.

Column 9, line 26 (claim 11), after "claim" insert --7--.

Column 10, line 3 (claim 22), change "1" to --7--.

Column 10, line 35 (claim 29), change "undulating screens" to --screen--; and before "screens" insert --undulating--.

Column 10, line 38 (claim 30), before "said" insert --,--.

Column 10, line 57 (claim 31), before "comprising" insert --, said assembly--.

Signed and Sealed this

Twenty-fifth Day of July, 1995

Attest:

BRUCE LEHMAN

*Attesting Officer*    *Commissioner of Patents and Trademarks*